(12) United States Patent
Takaishi

(10) Patent No.: US 6,950,258 B2
(45) Date of Patent: Sep. 27, 2005

(54) HEAD POSITIONING CONTROL METHOD AND DEVICE FOR STORAGE DISK APPARATUS

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/802,188

(22) Filed: Mar. 8, 2001

(65) Prior Publication Data

US 2001/0013984 A1 Aug. 16, 2001

(30) Foreign Application Priority Data

Sep. 25, 1998 (JP) .......................................... 10-271839

(51) Int. Cl.⁷ ................................................ G11B 5/09
(52) U.S. Cl. ............................. 360/51; 360/63; 360/69; 360/75
(58) Field of Search ............................. 360/51, 63, 75, 360/69, 76, 77.08

(56) References Cited

U.S. PATENT DOCUMENTS

| | | | | |
|---|---|---|---|---|
| 6,067,206 A | * | 5/2000 | Hull et al. | ............... 360/77.08 |
| 6,081,397 A | * | 6/2000 | Belser | ........................ 360/51 |
| 6,208,480 B1 | * | 3/2001 | Tigner | ........................ 360/63 |
| 6,297,926 B1 | * | 10/2001 | Ahn | ........................ 360/77.04 |
| 2003/0007276 A1 | * | 1/2003 | Satoh | ........................ 360/63 |

FOREIGN PATENT DOCUMENTS

| | | | |
|---|---|---|---|
| JP | 7220419 | 8/1995 | |
| JP | 9213033 | 8/1997 | |
| WO | 94/12981 | 6/1994 | |
| WO | WO-94/12981 | * 6/1994 | ........... G11B/17/00 |

* cited by examiner

Primary Examiner—David Hudspeth
Assistant Examiner—Dan I Davidson
(74) Attorney, Agent, or Firm—Greer, Burns & Crain, Ltd.

(57) ABSTRACT

In a head positioning method and device in which the position of servo signals between heads is not uniform, it is aimed to reduce the time taken to find the servo signals when heads are switched. A storage disk device comprises storage disks with the servo signals, a plurality of heads that read the information from the storage disks, an actuator that moves the heads, and a control circuit that positions the heads based on the servo signals read from the storage disks by a selected head. This control circuit includes a synchronization circuit that, in response to a head switching cue, synchronizes the time of a servo gate signal (of the head to which switching is directed) for detecting a servo signal with the time of the servo signal read by the head to which switching is directed, and a processing circuit that reads the servo signal for the head in response to the synchronized detection signal and positions the head in response to the servo signal read.

10 Claims, 13 Drawing Sheets

HEAD POSITIONING CONTROL METHOD AND DEVICE FOR STORAGE DISK APPARATUS

This is a continuation of International Application No. PCT/JP99/00535 filed on Feb. 5, 1999.

FIELD OF THE INVENTION

The present invention relates to a head positioning control method and device that reads servo signals of a storage disk and positions a head in a storage disk apparatus that uses the head to read/write information from/to the storage disk and more particularly to a head positioning control method and device for a storage disk device with a plurality of heads.

DESCRIPTION OF THE RELATED ART

Storage disk devices, such as magnetic disk devices, are widely used as storage devices in computers. In these types of storage disk devices, the format of the storage disk is divided into sectors. Servo signals are recorded onto these sectors. The head reads these servo signals and is positioned at the center of a track. High-density recording is required in these types of storage disk devices.

FIG. 12 is a schematic view of the conventional art, FIG. 13 is a relational view of conventional servo signals, and FIG. 14 is a relational view of other conventional servo signals.

As shown in FIG. 12, a magnetic disk device has magnetic disks 90 and magnetic heads 91-*a* through 91-*d*. Servo signals are recorded for each sector on the magnetic disks 90. Magnetic heads 91-*a* through 91-*d* read information from and write information to the magnetic disks 90. The spindle motor 92 rotates the magnetic disks 90. The voice coil motor 93 positions the magnetic heads 91-*a* through 91-*d*.

The servo signal demodulator (FIG. 12) detects the servo signals from the read output of one of the magnetic heads 91-*a* through 91-*d* in response to a servo gate signal and demodulates the servo signal into a position signal. The read-write circuit 96 demodulates read data from the output read from the magnetic heads 91-*a* through 91-*d* and supplies write data to magnetic heads 91-*a* through 91-*d*.

The control circuit 95 calculates the current head position in response to the demodulated position signal and creates a drive value for the voice coil motor 93. That is, during seek control (coarse control), the control circuit 95 calculates the current position from the servo signal and creates a current indication value in response to the distance from the target position. Also, while on track (during fine control), the control circuit 95 determines the deviation of the head from the center of the track from the servo signal and creates a current indication value.

In this type of servo control system, servo signals are recorded onto each sector of the magnetic disks 90 so that the positions of magnetic heads 91-*a* through 91-*d* can be detected. When a device is equipped with a plurality of magnetic heads, positioning is controlled using servo signals read by the read/write head to be selected.

FIG. 13 shows the timing of the servo signals SV from each head when the heads reproduce the signals. A servo signal SV is actually only read in one head but here, to show the servo signal SV timing for each head, servo signals from all heads are shown for convenience.

As shown in FIG. 13, the servo signals SV read by each head 0 through 2 (91-*a* through 91-*c*) are produced with the same timing. For example, when head 0 is switched over to head 1, the time when the servo signal SY is read does not change. That is, the servo signals for each head exist at the same time. Therefore, the servo gate signal for detecting the servo signal is produced at the same time regardless of the head involved.

FIG. 14 shows the method called the staggered sector for recording servo signals SV. The times when the servo signals SV for each head are written are staggered in constant time intervals T1. This method enables heads to be sequentially selected and the servo signal to be sequentially written when a servo signal is written to a magnetic disk. Accordingly, the servo signals can be written rapidly. In this method, the times at which servo gate signals, which are used in detecting the servo signals, are produced are staggered using a constant interval.

Thus, in the conventional art, the timing of servo gate signals for detecting servo signals in each head is the same or staggered using a constant interval.

FIG. 15 explains the problems with the conventional art.

The study is done concerning the assembly of a magnetic disk into the device after the servo signals are recorded onto the magnetic disk. In comparison to the method of recording servo signals after the magnetic disk is assembled into the device, this method would enable higher-density recording of servo signals.

That is, the voice coil motor in the magnetic disk device is required to move quickly. It is difficult to demand high-density positioning accuracy of this voice coil motor. Therefore, magnetic disk servo signals are written using a high-accuracy servo-writing device outside the device. The magnetic disk that writes the servo signals is then mounted onto the device.

This enables highly accurate recording of servo signals and high-density recording in the magnetic disk device. However as shown in FIG. 15, when a magnetic disk that has recorded servo signals is mounted, the servo signal SV period Ts for each head is constant, but the time intervals for servo signals between heads differ.

That is, the slight discrepancies in the positions of each head in the magnetic disk device, the slight discrepancies in the positions of the external write head and the internal read head, and the slight discrepancy in the mounting position of each magnetic disk cause the servo signal time interval between heads to vary. In FIG. 15, the time interval T1 between head 0 and head 1 is different from the time interval T2 between head 2 and head 0.

Therefore, the servo signal must be sought when the heads are switched over causing the problem of a long time being required for switching heads.

SUMMARY OF THE INVENTION

An object of the present invention is to provide a head positioning control method and device for a storage disk apparatus to enable a reduction in the head switching time even when the servo signal time changes for each head.

A further object of the present invention is to provide a head positioning control method and device for a recording disk apparatus that does not require a search for the servo signals even when the servo signal time changes for each head.

A still further object of the present invention is to provide a head positioning control method and device for a recording disk apparatus that will synchronize servo gate signals with servo signals even when the servo signal time changes for each head.

In an aspect of the present invention, the storage disk apparatus comprises a storage disk for recording servo signals, a plurality of heads for reading information on the storage disk, an actuator for moving the heads, and a control circuit that positions the heads based on servo signals read from the storage disk by the selected head.

This head positioning control method comprises a step for synchronizing the time of a servo gate signal read by the head to which switching for detecting a servo signal with the time of a servo signal that is read by the head to which switching is directed in response to a head switching cue, and a step of reading a servo signal in response to the synchronized servo gate signal and positioning the head in response to the read servo signal.

The present invention synchronizes the time at which a servo gate signal is produced with the time of the servo signal for the head to which switching is directed in response to a head switching cue. This means that because the time at which the servo gate signal is generated is synchronized with the time of the servo signal for the head to which switching is directed, that servo signal can be detected even if the operation to find the servo signal at the time head switching occurs is omitted. Therefore, the head switching time can be reduced and fast head switching enabled.

Also, in another aspect of the present invention, the synchronization step comprises a step for determining the time at which the servo signal is read by the head to which switching is directed in response to the head switching cue, and a step for synchronizing the time of the servo gate signal with that determined time.

In still another aspect of the present invention, the time determining step comprises a step for determining above time so that the time value is greater than a single sample period in positioning control.

In still another aspect of the present invention, the time determining step includes a step for reading the time at which the head to which the above switching is directed from the memory in which are stored the times that servo signals are read from each head.

In still another aspect of the present invention, the time determining step is a step for determining the time difference between the time of detection of the above servo signal for the head at which switching originates and the time of detection of the above servo signal for the head to which the above switching is directed. Furthermore, the synchronizing step comprises a step that shifts in time the above servo gate signal by that time difference.

In still another aspect of the present invention, the time determining step comprises a step for determining the detection time for the servo signal of the head prior to switching, a step for determining the detection time for the said servo signal of the head to which switching is directed, and a step for determining the time difference between the two times.

In still another aspect of the present invention, the positioning step comprises a step for determining the time difference between the detection time for the head prior to the above switching is done in response to a head switching cue and the detection time for the head to which switching is directed, a step for determining whether or not the time difference is shorter than the interval for one sample, and a step for inhibiting positioning in response to above detection signal when the time difference is shorter than the interval for one sample.

DESCRIPTION OF THE PREFERRED EMBODIMENTS

Figure 1:
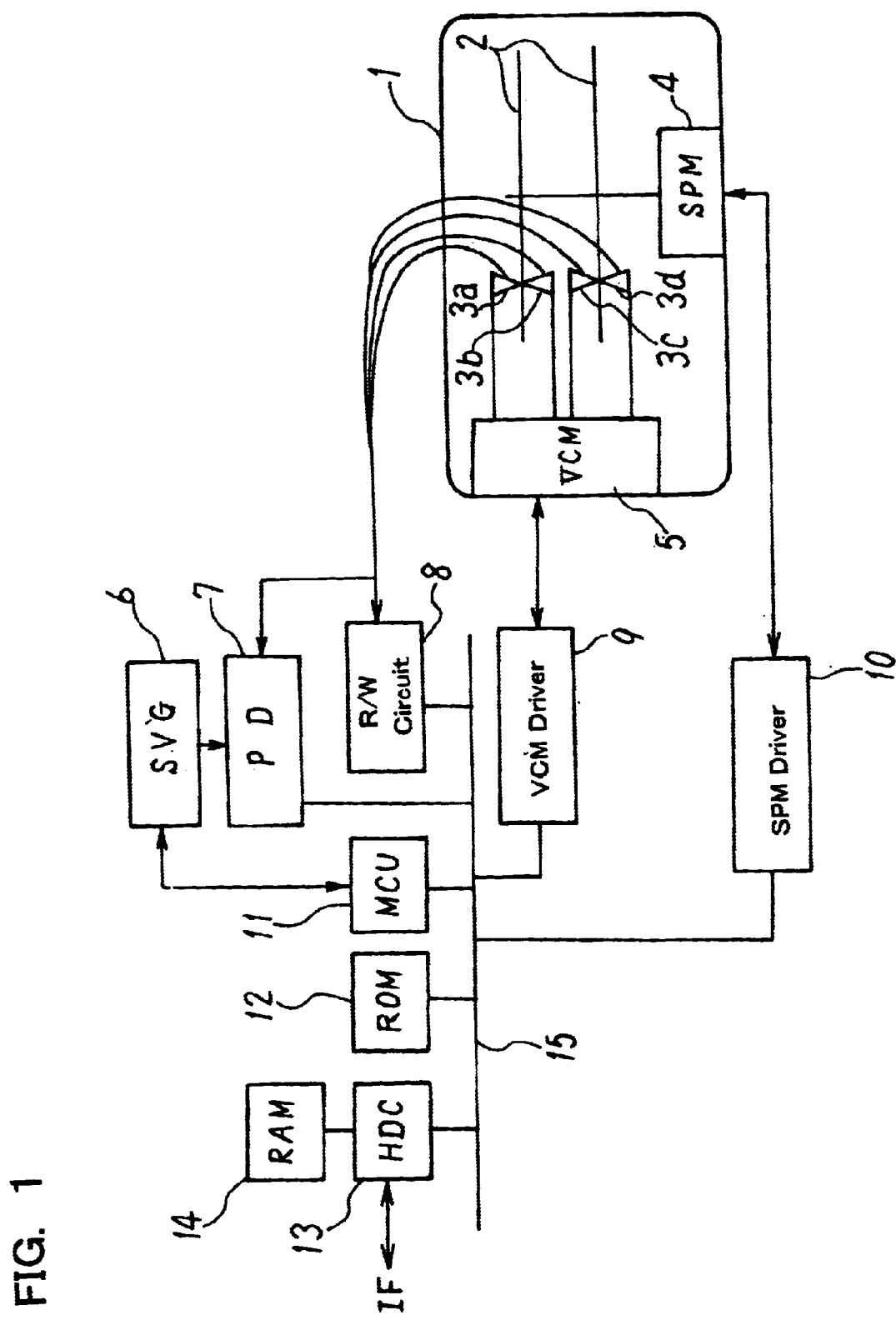
FIG. 1 is a block diagram of an aspect of the embodiment of the present invention.
Figure 2:
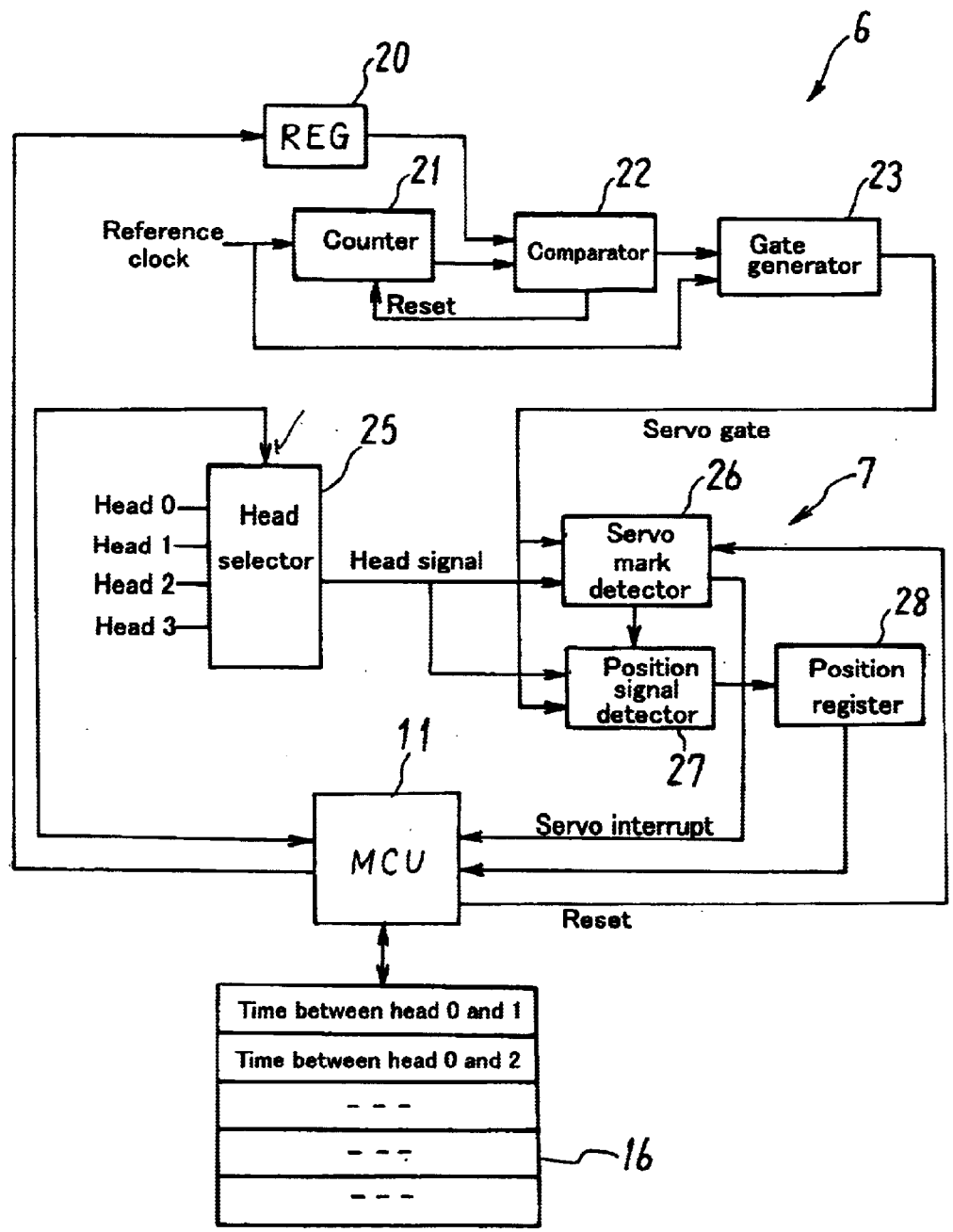
FIG. 2 is a block diagram of the position detection circuit of FIG. 1.
Figure 3:
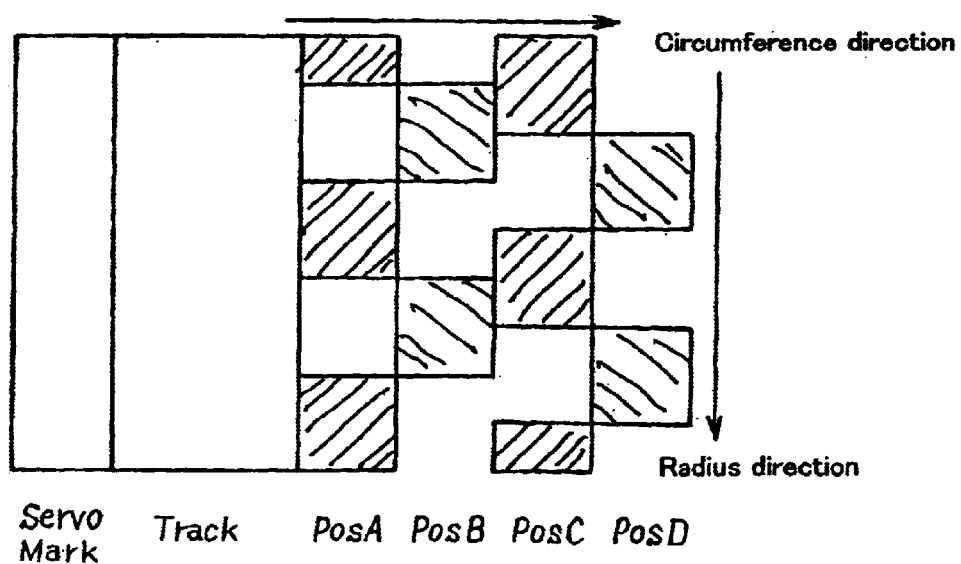
FIG. 3 explains the servo signal of FIG. 1.
Figure 4:
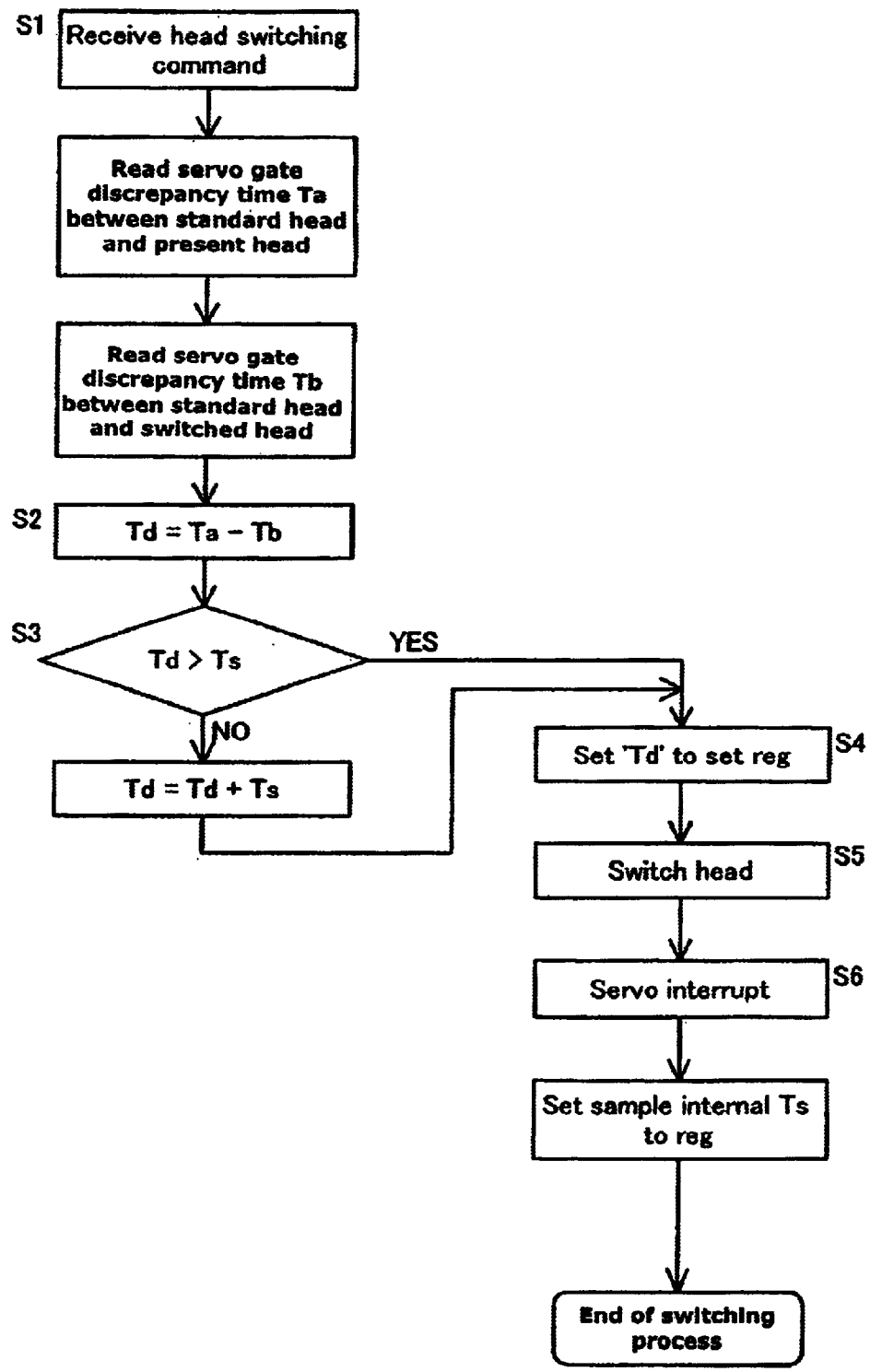
FIG. 4 is a flowchart showing the head switching process of FIG. 2.
Figure 5:
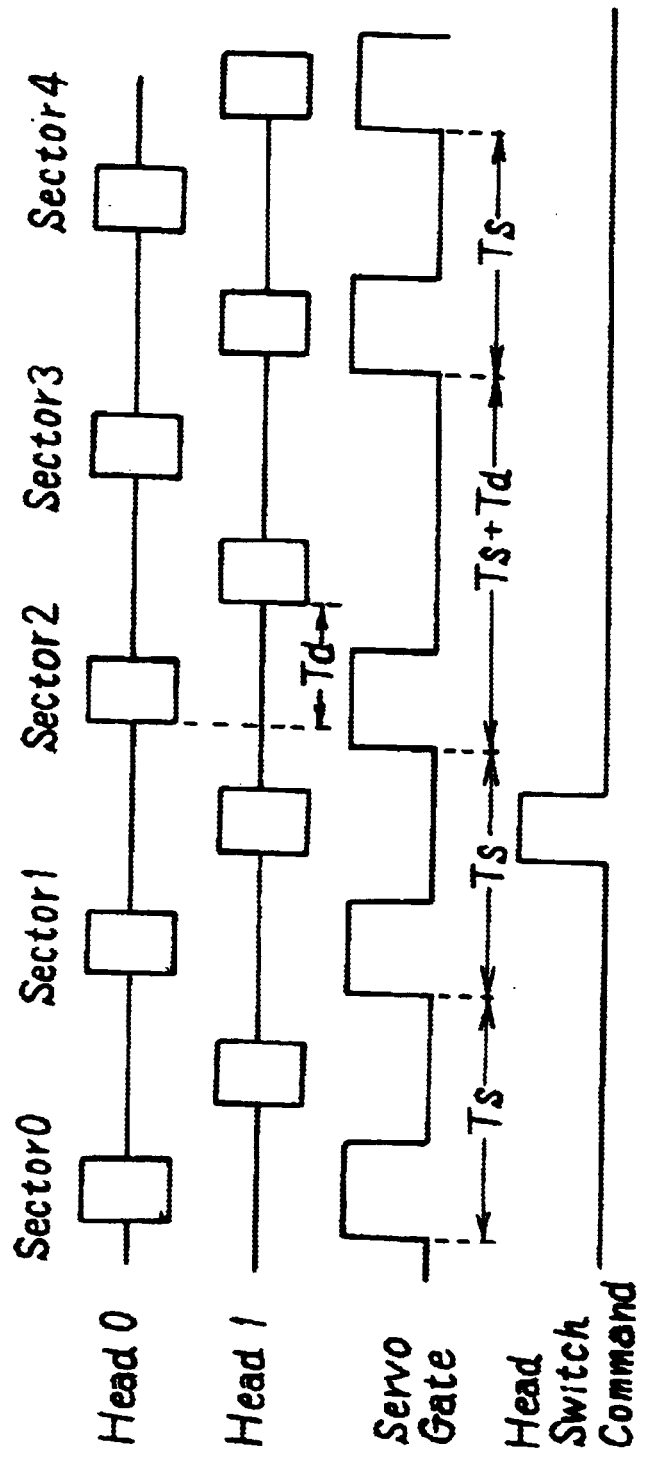
FIG. 5 explains the head switching operation of FIG. 2.

FIG. 1 is a block diagram of an aspect of the embodiment of the present invention, FIG. 2 is a block diagram of the position detection circuit of FIG. 1, FIG. 3 explains the servo signals, FIG. 4 is a flowchart explaining head switching, and FIG. 5 explains the head switching operation.

As shown in FIG. 1, the magnetic disk drive 1 comprises magnetic disks 2 and magnetic heads 3a through 3d. Servo signals are embedded in each sector of the data tracks in the magnetic disks 2. As shown in FIG. 3, the servo signal comprises the servo mark signal used to identify the servo signal, a track number that identifies the track number, and a two-phase servo signal comprising position signals PosA, PosB, PosC, and PosD.

Magnetic heads 3a through 3d read and write information from/on the magnetic disks 2. The spindle motor 4 rotates magnetic disks 2. The voice coil motor 5 positions magnetic heads 3a through 3d to a cylinder of magnetic disks 2. A servo gate generator 6 produces a servo gate signal with a servo signal period Ts. In response to the servo gate signal, the position detection circuit 7 demodulates the servo signal from magnetic heads 3a through 3d into a position signal.

The read-write circuit 8 demodulates read signals from magnetic heads 3a through 3d and sends write data to magnetic heads 3a through 3d. The VCM drive circuit 9 drives the voice coil motor 5. The SPM drive circuit 10 drives the spindle motor 4.

The micro-controller 11 comprises a microprocessor, an analog to digital converter and a digital to analog converter, and reads servo signals in response to the servo gate signal. The controller 11 calculates the current head position from the servo signal and creates a current indication value in response to the distance from the target position.

The ROM 12 stores the programs and data required for micro-controller 11 processing. The hard disk controller 13 controls the interface with higher-level computers. The RAM 14 is the memory used by the hard disk controller 13. The address-data bus 15 connects the hard disk controller 13, the ROM 12, the micro-controller 11, the position detection circuit 7, the read-write circuit 8, the VCM drive circuit 9, and the SPM drive circuit 10 and exchanges data.

Details of the position detection circuit will now be explained with reference to FIG. 2.

As shown in FIG. 2, the servo gate generator 6 comprises a time setting register 20, a counter 21, a comparison unit 22, and a gate generation unit 23. The time setting register 20 sets the time at which the servo gate will be generated from the micro-controller 11. The counter 21 counts the number of reference clock pulses. The comparison unit 22 compares the time set in register 20 and the value of the counter 21 and produces a matched output when the two match. The comparison unit 22 sends reset data to the counter 21 when the set time and the counted value match. In response to the matched output from the comparison unit 22, the gate generation unit 23 generates a servo gate signal.

The position detection circuit 7 comprises a head selection unit 25, a servo mark detection unit 26, a position signal detection unit 27, and a position information register 28. In response to a head switching signal from the micro-controller 11, the head selection unit 25 selects read output from the specified magnetic head. In response to a servo gate signal, the servo mark detection unit 26 detects the servo mark from the read signal for the head. In response to the servo gate signal and servo mark detection signal, the position signal detection unit 27 demodulates the servo signal from the read signal for the head into a position signal. The position information register 28 stores the demodulated position information.

When the servo mark detection unit 26 has detected the servo mark, the micro-controller 11, in response to the servo interruption generated by the servo mark detection unit 26, processes servo control. That is, in response to servo interruption, the micro-controller 11 reads the position information from the position information register 28. Then, in response to the position information, the micro-controller 11 calculates the command current value. Furthermore, the micro-controller 11 sends the command current value to the VCM drive circuit 9.

Memory 16 is connected to this micro-controller 11. The memory 16 stores the time discrepancy that shows the servo gate time discrepancies between each magnetic head and the standard head. Here, the standard head is head 0. The discrepancies between the servo gate times for each head 1, 2, and 3, and the standard head 0 are stored. For example, as shown in FIG. 5, the discrepancy between the servo gate times of head 1 and head 0 is Td.

The operation of the circuit in FIG. 2 will now be explained. The counter 21 calculates the reference clock. The comparison unit 22 compares the time set in register 20 with the value calculated by counter 21. When the time set in register 20 matches the value calculated in counter 21, a match signal is sent to the gate generation unit 23. When the comparison unit 22 detects a match it resets counter 21.

The gate generation unit 23, in response to the match signal, generates a servo gate signal with the reference clock timing. The servo mark detection unit 26 detects the servo mark (refer to FIG. 3) from the data output from the head in response to the servo gate signal. The servo mark detection unit 26 cues the position signal detection unit 27 to detect the position in response to the servo mark detection. In addition, the servo mark detection unit 26 sends a servo interruption to the micro-controller 11.

The position signal detection unit 27 demodulates the servo signal (refer to FIG. 3) from the data read from the head and sets this in the position information register 28. The micro-controller 11 that received the servo interruption starts servo processing. That is, the micro-controller 11 reads the position information stored in the position information register 28 and calculates the deviation from the target position. Also, the micro-controller 11 creates a current indication value to eliminate the deviation, and then sends the current indication value to the VCM drive circuit 9.

Head switching process will be explained with reference to FIG. 4.

(S1) When the micro-controller (hereinafter referred to as the MCU) 11 receives a head switching command, it reads the servo gate time discrepancy Ta between the current head and the standard head from memory 16. Next, the MCU 11 reads the servo gate time discrepancy Tb between the head to which switching is directed and the standard head from memory 16.

(S2) The MCU 11 calculates the time difference Td by calculating (Ta−Tb).

(S3) The MCU 11 determines whether or not the time difference Td is larger than the servo signal period Ts. When the time difference Td is not larger than the period Ts, the interval between servo gate signals will be smaller than the period Ts. This means that while the servo period Ts is not being reached, servo interruption will be generated and MCU 11 processing may not occur in time. Therefore, when the time difference Td is not greater than the period Ts, the servo gate signal will be delayed by one sample period. In other words Td will be converted to (Td+Ts).

(S4) Next, the MCU 11 sets the time difference Td in the servo gate time setting register 20 shown in FIG. 3 at the servo interruption timing. This causes the comparison unit 22 to generate matched output after the time difference Td has passed. This in turn causes the servo gate generation unit 23 to then generate a servo gate signal after the time difference Td has passed.

(S5) Next, the MCU 11 switches heads. That is, the MCU 11 sends the number of the head to which switching is directed to the head selection unit 25. This causes head switching.

(S6) When the MCU 11 detects servo interruption, it sets the sample period Ts in the servo gate time setting register 20. Processing then ends.

In this way, the servo gate signals are synchronized at the time of the servo signal for the head to which switching is directed. Therefore, the time discrepancies between servo signals for all heads are stored and the time difference between the servo signals of current head and the servo signals of head to which switching is directed is calculated. The time at which the servo gate signal is generated is then synchronized with this time difference. FIG. 5 shows the relationship between the servo signals for each head when heads are switched from head 0 to head 1 and the servo gate signals. In this example, the time discrepancy for head 0 Ta is "0" and the time discrepancy between head 0 and head 1 is Tb. The servo gate signal shown is for when the time difference Td is smaller than the sample period Ts.

In the diagram, the interval between servo gate signals after the head switching command arrives is converted to Td+Ts and synchronized with the position signal for head 1. Thereafter, the interval between servo gate signals returns to the sample period Ts.

Thus, when head switching occurs, the time difference between the detection time for the servo signal for the head to which switching is directed and the detection time for the servo signal for the head from which switching originates is calculated, and the time at which the servo gate signal is generated is synchronized with the servo signal detection time for the head to which switching is directed. Therefore, even if heads are switched, the servo signal can be detected immediately from the head to which switching is directed.

Figure 6:
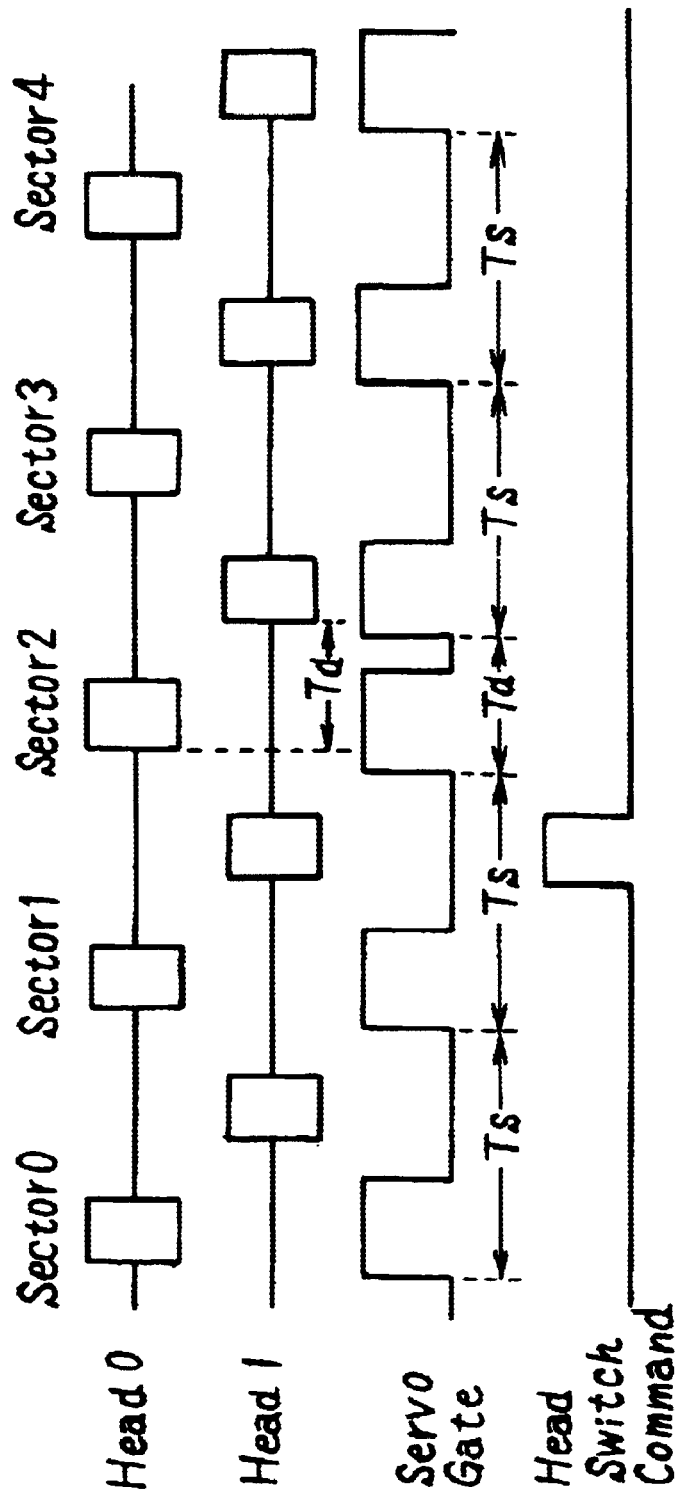
FIG. 6 is a relational view of servo gate signals in a second aspect of the embodiment of the present invention.

FIG. 6 gives a relational view of servo gate signals in a second aspect of the embodiment of the present invention. FIG. 6 shows head switching from head 0 to head 1. In the examples in FIGS. 4 and 5, the time difference Td was calculated to make it the same as or higher than the sample period Ts. However, the example shown in FIG. 6 uses the time difference Td as is.

That is, the processing in Step S3 of FIG. 4 does not take place. Thus, when the time difference Td is smaller than the sample period Ts, as shown in FIG. 6, the servo gate signal is generated before one sample interval Ts has passed in the synchronization operation for servo gate signals that occurs after the head switching command has been received. This causes servo interruption to be generated. However, when the processing capability of the MCU 11 is high, this servo interruption can be processed. Also, as will be explained below, the MCU 11 can be set to ignore this interruption.

Figure 7:
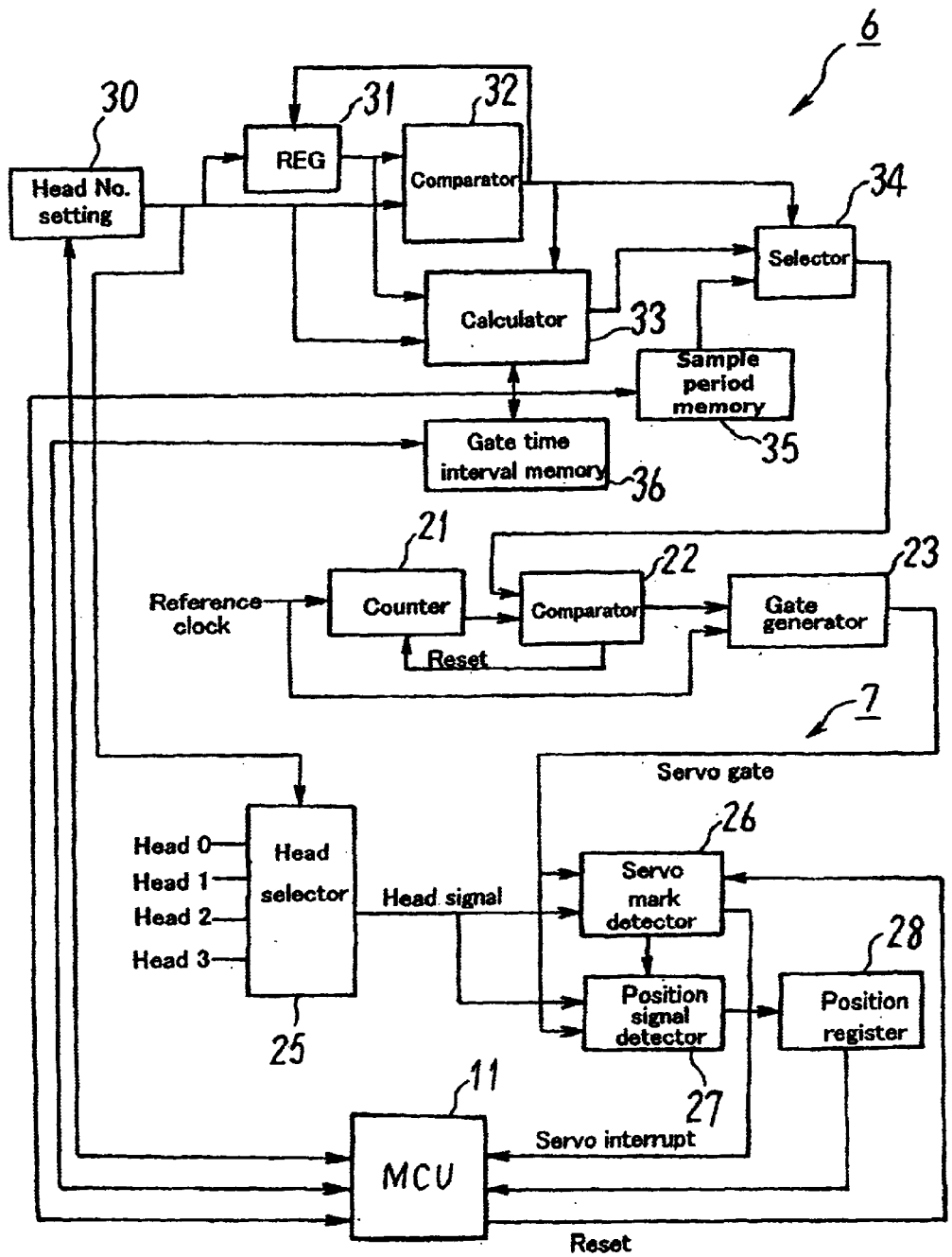
FIG. 7 is a block diagram of a third aspect of the embodiment of the present invention.

FIG. 7 is a block diagram of a third aspect of the embodiment of the present invention. FIG. 7 shows a modification of the position detection circuit of FIG. 2. In FIG. 7, the parts that are the same as parts shown in FIG. 2 are shown using the same codes.

The head number setting unit 30 sets the number of the head to be operated from the MCU 11. The register 31 stores the head number set in the head number setting unit 30. The comparison unit 32 compares the head number in the head number setting unit 30 and the head number in the register 31. The comparison unit 32 deems there to be a head switching cue when the two head numbers do not match and cues the register 31 to store the head number of the head number setting unit 30.

When the two head numbers do not match, the comparison unit 32 cues the calculation unit 33 to calculate the time difference. When the two head numbers do not match, the comparison unit 32 cues the selection unit 34 to select the output of the calculation unit 33.

As with memory 16 in FIG. 2, the gate time interval memory 36 stores the servo gate time discrepancies between heads 1 and 2 and the standard head. The calculation unit 33 reads the gate time interval memory 36 using the head number in the head number setting unit 30 and then obtains the time discrepancy Tb for the head to which switching is directed. The calculation unit 33 reads the gate time interval memory 36 and obtains the current head time discrepancy Ta by using the head number in the register 31. The calculation unit 33 then subtracts time discrepancy Tb from time discrepancy Ta to obtain the time difference Td.

The sample period memory 35 stores the sample period Ts for the servo gate signal. In response to the unmatched output of the comparison unit 32, the selection unit 34 selects the time difference Td from the calculation unit 33 and, in response to a matched output of the comparison unit 32, selects the sample period Ts of the sample period memory 35. The output of this selection unit 34 is entered into the comparison unit 22 as the gate interval.

The operation of this circuit will now be explained. The comparison unit 32 compares the head number in the head number setting unit 30 with the head number in the register 31. When these head numbers do not match, the comparison unit 32 deems this to be a head-switching cue. The comparison unit 32 cues the calculation unit 33 to calculate the time difference.

When the two head numbers do not match, the comparison unit 32 cues the calculation unit 33 to calculate the time difference. When the two numbers do not match, the comparison unit also cues the selection unit 34 to select the output of the calculation unit 33.

The calculation unit 33 reads the gate time interval memory 36 using the head number in the head number setting unit 30 to obtain the time discrepancy Tb for the head to which switching is directed. The calculation unit 33 reads the gate time interval memory using the head number of the register 31 to obtain the time discrepancy Ta for the current head. Then, the calculation unit 33 subtracts time discrepancy Tb from time discrepancy Ta to obtain the time difference Td.

A "no match" comparison in comparison unit 32 will cause the selection unit 34 to select the time difference Td in calculation unit 32 as the gate interval. As in FIG. 2, the comparison unit 22 compares the time set in the register 20 with the value calculated in counter 21. When the time set in register 20 and the value calculated in counter 21 match, the comparison unit 22 sends a match signal to the gate generation unit 23. The comparison unit 22 also resets counter 21 when a match is detected.

In response to a match signal, the gate generation unit 23 generates a servo gate signal with the reference clock timing. In response to the servo gate signal, the servo mark detection unit 26 detects the servo mark (refer to FIG. 3) from the data read from the head. In response to the detection of the servo mark, the servo mark detection unit 26 cues the position signal detection unit 27 to detect a position. In addition, the servo mark detection unit 26 sends a servo interruption to the micro-controller 11.

The position signal detection unit 27 demodulates the servo signal (refer to FIG. 3) from the data read from the head and sets this into the position information register 28. The micro-controller 11 that received the servo interruption starts servo processing. That is, the micro-controller 11 reads the position information from the position information register 28 and calculates the deviation from the target position. The micro-controller 11 then creates a current indication value to eliminate this deviation and send the current indication value to the VCM drive circuit 9.

On the other hand, a "no match" signal in the comparison unit 32 will cause the register 31 to be updated and the register 31 will then store the head number from the head number setting unit 30. This in turn will cause the comparison unit 32 to generate a match signal and the selection unit 34 to switch to the sample period memory 35. This will result in the selection unit 34 sending the sample period Ts as the gate interval.

Thus, the functions of the MCU 11 firmware in FIG. 2 can also be achieved through hardware.

Figure 8:
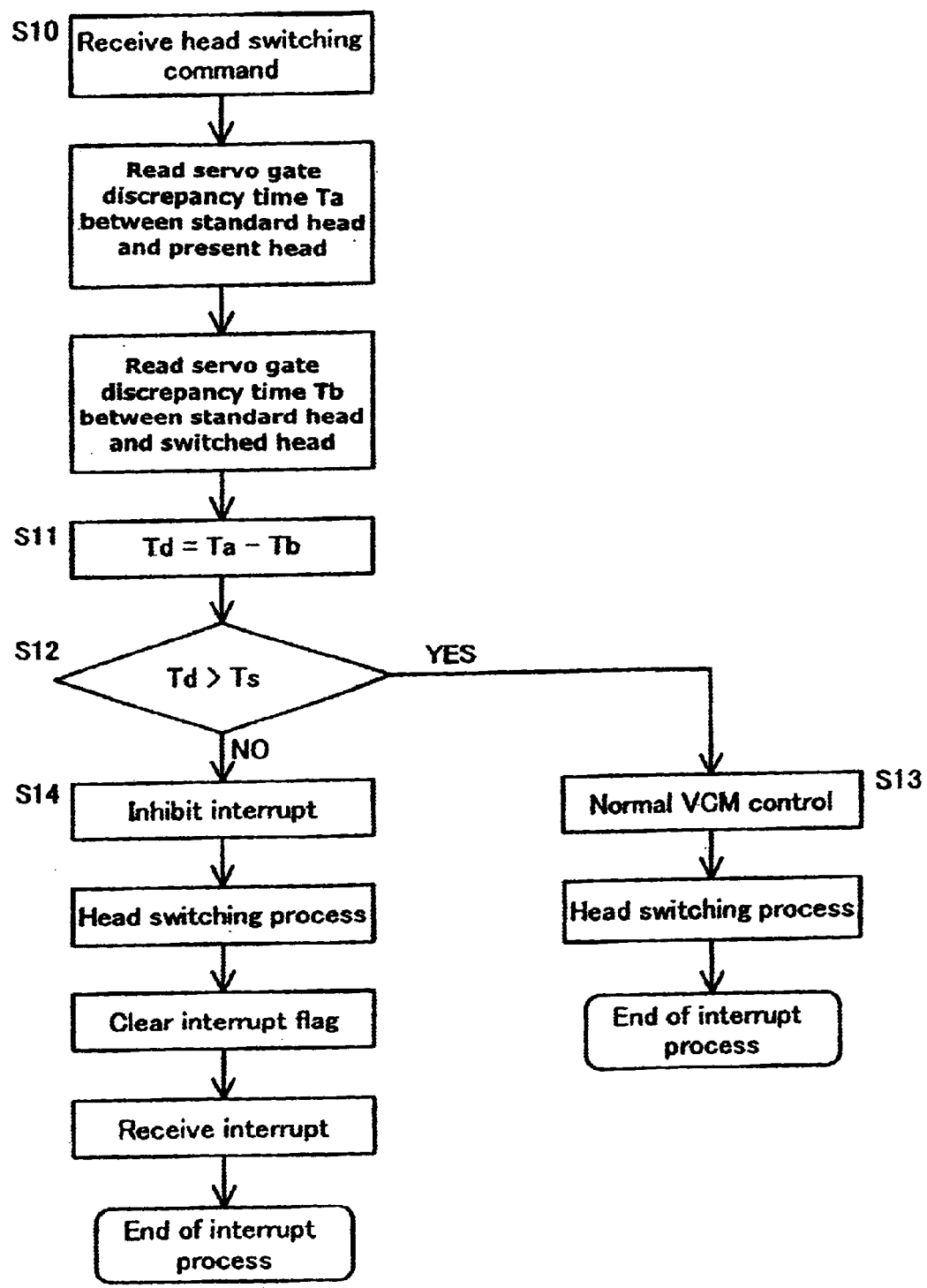
FIG. 8 is a flowchart showing the processing of a fourth aspect of the embodiment of the present invention.

FIG. 8 is a flowchart for processing in a fourth aspect of the embodiment of the present invention and shows the processing involved in head switching.

(S10) When the MCU 11 receives a head switching command, it reads the servo gate time discrepancy Ta between the current and standard heads from memory 16. Next, the MCU 11 reads the servo gate time discrepancy Tb between the head to which switching is directed and the standard head from memory 16.

(S11) The MCU 11 calculates the time difference by calculating (Ta−Tb).

(S12) The MCU determines whether or not the time difference Td is larger than the servo signal period Ts. When the time difference Td is not larger than the period Ts, the interval between servo gate signals is smaller than period Ts. Thus, while the servo period Ts is not reached, a servo interruption will be produced and multiple interruptions may occur during positioning by the MCU 11.

(S13) When the time difference Td is larger than the period Ts, the MCU 11 will start VCM processing (servo positioning) in response to the servo interruption. It will then start head switching and end interruption processing.

(S14) Conversely, when the time difference Td is not larger than the period Ts, the MCU 11 will inhibit servo interruptions and will start head switching. Also, the MCU 11 will clear the interruption flag and permit interruptions. The MCU 11 will then end interruption processing.

Thus, as explained in FIG. 6, the MCU 11 will inhibit interruptions when the time difference Td is less than the servo signal period Ts. That is, the MCU 11 is able to find out the time difference Td and the period Ts in advance when heads are switched. Therefore, when the time difference Td is less than the period Ts, in this sample, positioning control will not occur, interruption processing will end immediately, and the next interruption will be awaited.

Next, it is necessary to measure these types of head time discrepancies in advance. This can be done using a measurement device outside the disk device or a program within the disk unit.

Figure 9:
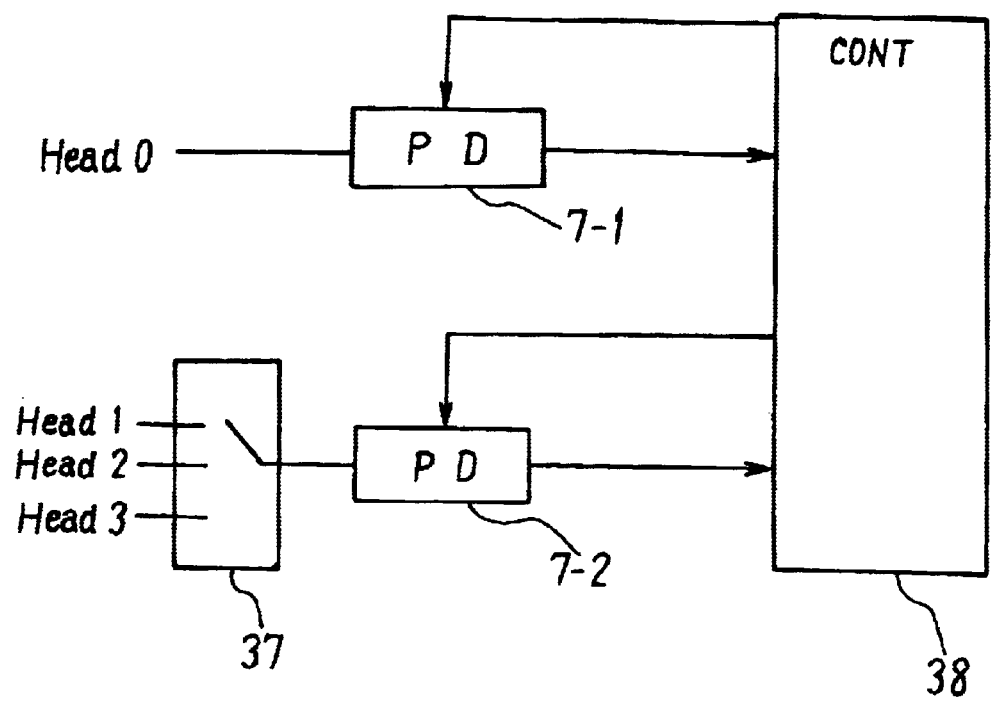
FIG. 9 is a block diagram of different time measurements between heads in the present invention.

FIG. 9 is a block diagram concerning the measurement of time discrepancies between heads. FIG. 9 is a block diagram of the external device for measuring the time discrepancies for each head in the magnetic disk device.

The external measurement device comprises the first position detection circuit 7-1, the second position detection circuit 7-2, a head selector 37, and a control circuit 38. The data read from the standard head 0 is input into the first position detection circuit 7-1. The data read from heads 1, 2, or 3 selected by the head selector 37 is input into the second position detection circuit 7-2.

During measurement, the control circuit 38 applies a servo gate signal that is always on to the first position detection circuit 7-1 and the second position detection circuit 7-2. This causes the servo mark detection unit of the first position detection circuit 7-1 to find a servo mark from the data read from head 0 and, upon detection, to output a servo mark detection pulse to the control circuit 38.

On the other hand, the servo mark detection unit in the second position detection circuit 7-2 finds the servo mark from the data read from the selected head (for example, 1) and, upon detection, outputs a servo mark detection pulse to the control circuit 38.

The control circuit 38 can measure the time discrepancy between the targeted head (for example, 1) and the standard head 0 by measuring the time between the two detection pulses. By appropriate selection of the head selector 37, the time discrepancy between head 2 and the standard head 0 and the time discrepancy between head 3 and the standard head 0 can be measured. These measurements are recorded in the memory 16 of FIG. 2 or in the memory of FIG. 7. Also, when the power is on, these measurements can be written to the magnetic disk track position first accessed by the head.

Figure 10:
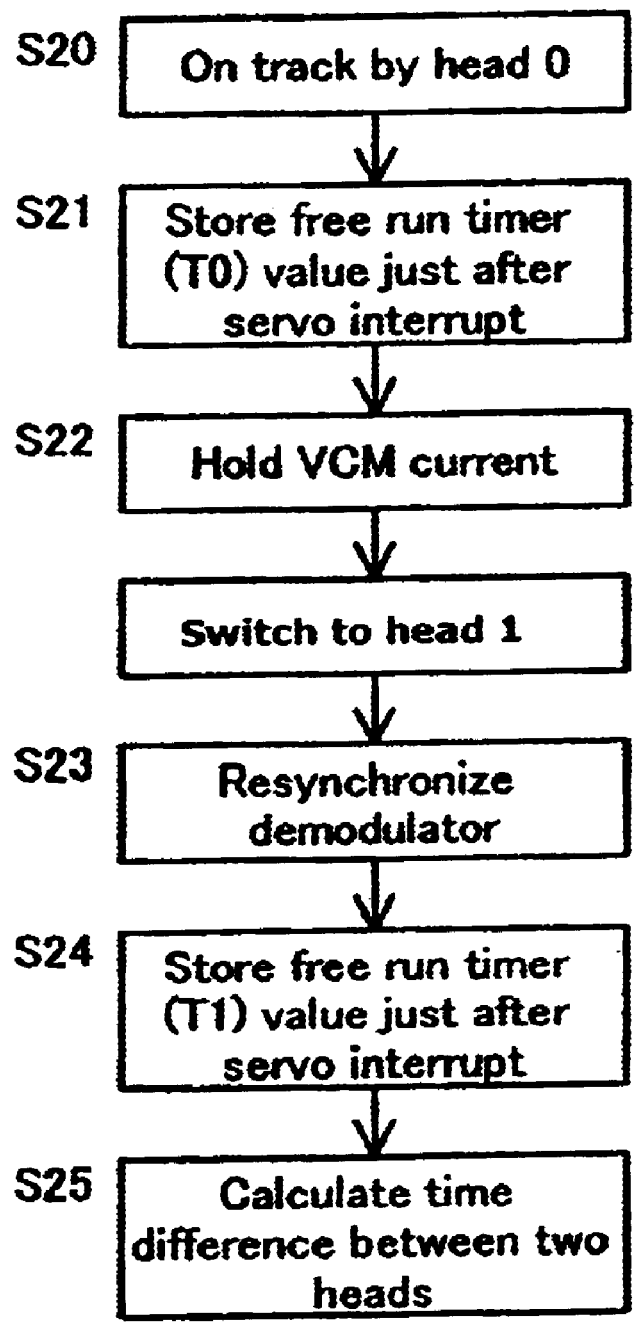
FIG. 10 is a flowchart showing the processing of the different times between heads in the present invention.

FIG. 10 is a flowchart for the measurement of time discrepancies between heads. FIG. 10 is a flowchart showing how the MCU in the magnetic disk unit measures time discrepancies.

(S20) The MCU 11 causes the free-run timer to operate and causes the magnetic disk to be on track with head 0. Here, the servo gate signal is always left on.

(S21) When the above position detection circuit 8 detects the servo mark, a servo interruption will be reported to the MCU 11. The MCU 11 records the free-run timer value (T0) immediately after the servo interruption.

(S22) The MCU 11 switches heads but does not synchronize with position signals or include the position. Therefore, it cannot control positioning. Here, the current supplied to the VCM when it is on-track with head 0 is maintained. This enables the current that runs when a constant bias has just been cancelled to flow to the VCM. When the VCM position is moved substantially, movement towards the edge of the magnetic disk (area where no position signals are written) is prevented. The head selection part 25 switches to the measurement head (for example, 1).

(S23) The MCU 11 again turns on the servo gate signal and resynchronises the position detection circuit (demodulation circuit).

(S24) When the servo mark is detected, the above position detection circuit 7 reports a servo interruption to the MCU 11. The MCU 11 then records the value for the free-run timer (T1) immediately after the servo interruption.

(S25) The MCU 11 calculates the time discrepancy from the remainder when the difference between the two timer values (T1−T0) is divided by the sample period Ts.

This is done for each head 1, 2, and 3, to be measured. Thus, the time discrepancies for each head are measured by the controller within the magnetic disk device. These measurements are stored in the memory 16 and recording part 36.

Figure 11:
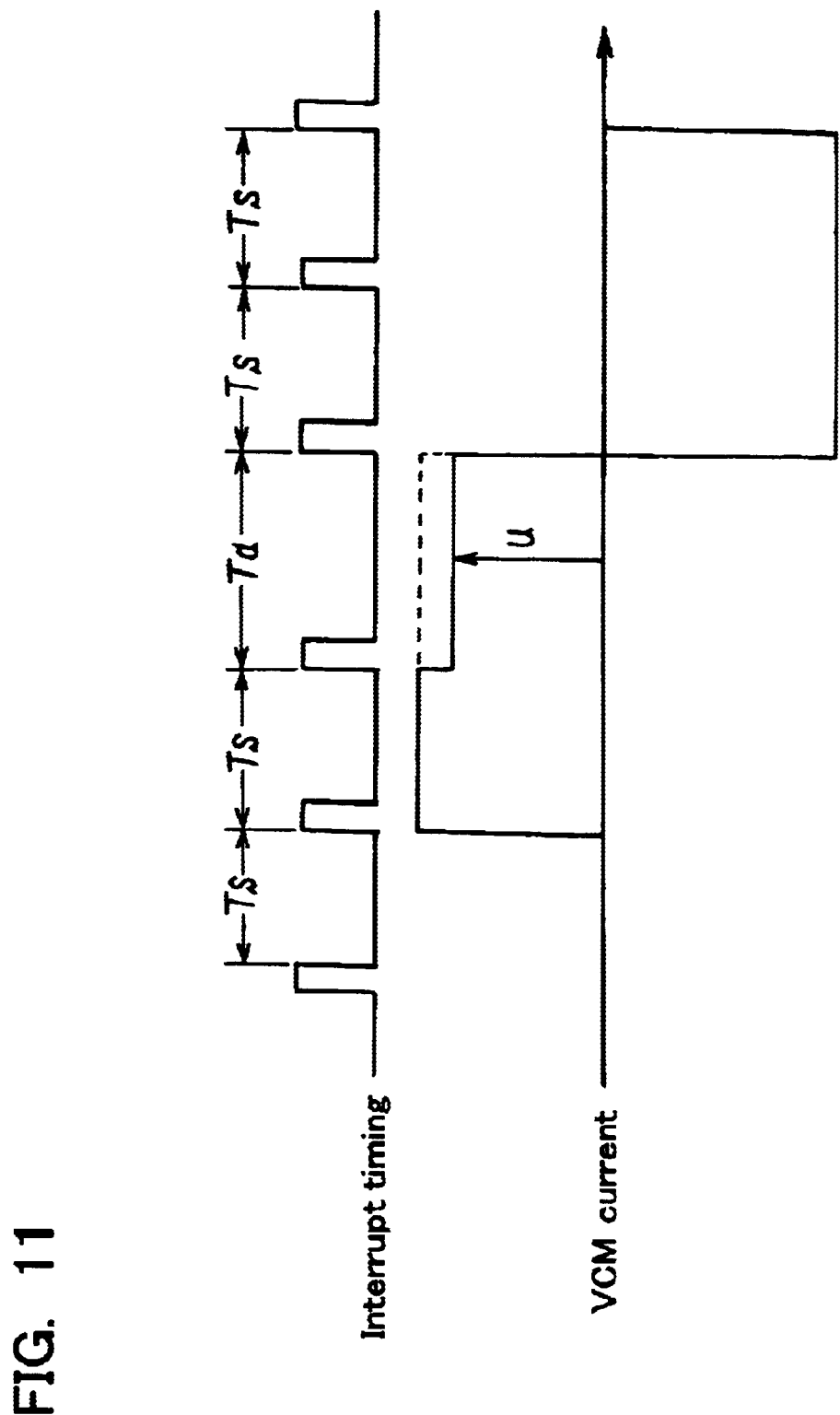
FIG. 11 explains a fifth aspect of the embodiment of the present invention.
Figure 12:
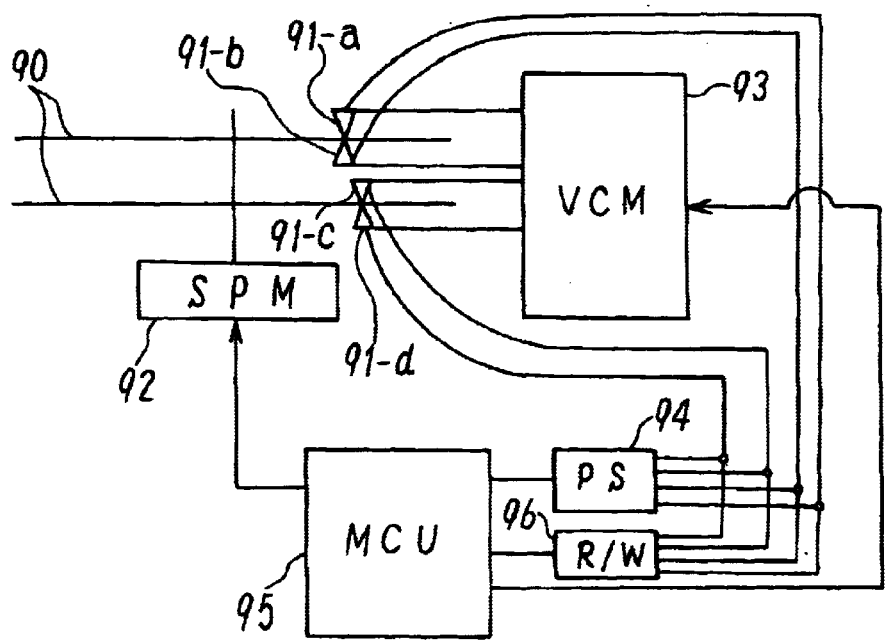
FIG. 12 is a schematic view of the conventional art.
Figure 13:
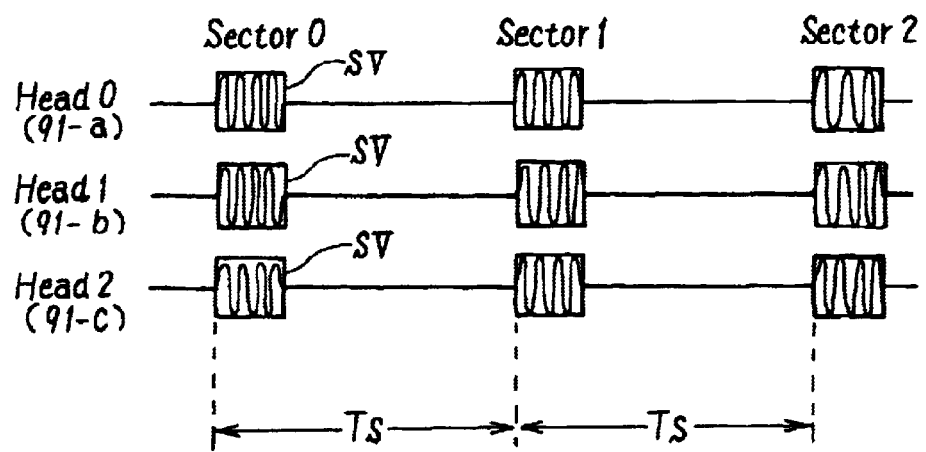
FIG. 13 is a relational view of conventional servo signals.
Figure 14:
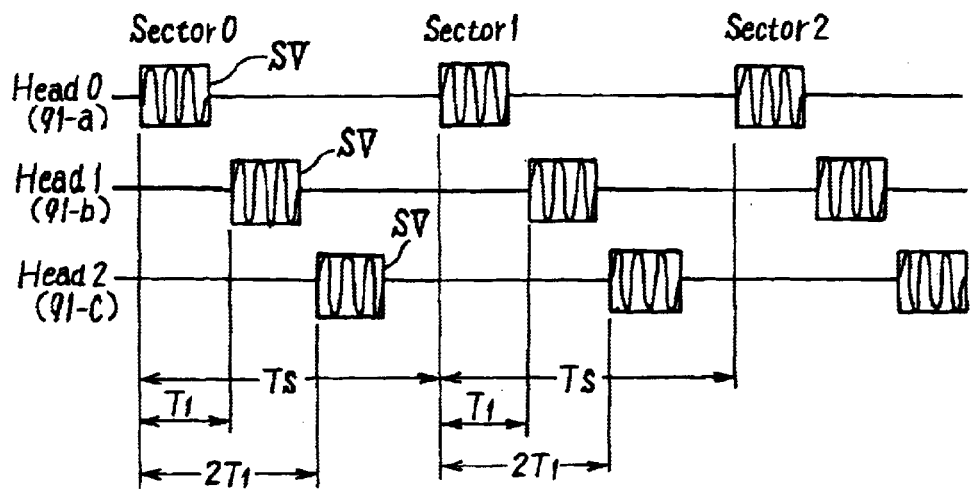
FIG. 14 is a relational view of other conventional servo signals.
Figure 15:
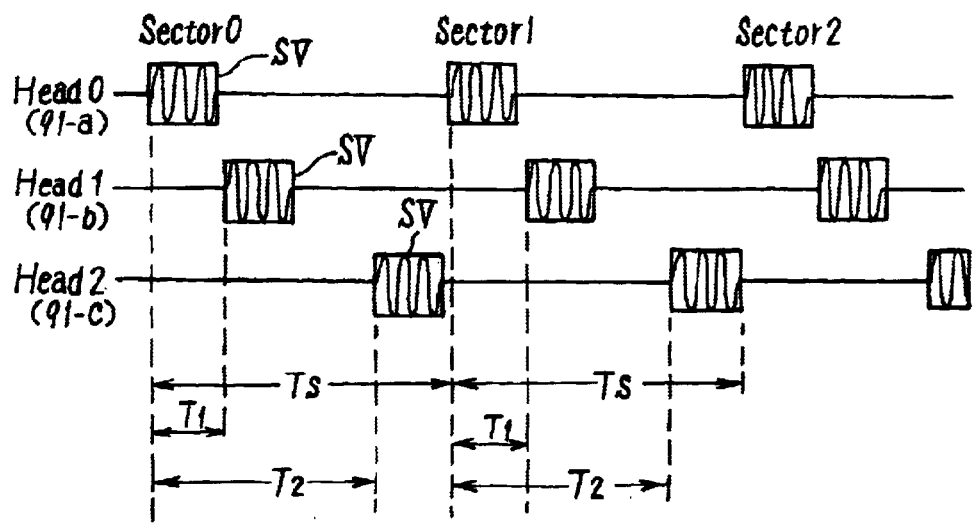
FIG. 15 explains problems with the conventional art.

FIG. 11 explains a fifth aspect of the embodiment of the present invention.

During positioning control, the current is calculated using a constant sample period Ts. However, when heads are switched, this period, like Td, is a different value to the sample period Ts. So, when heads are switched, the wave height value of the current flowing in the VCM is revised. That is, as shown in FIG. 11, when heads are switched the wave-form value u is determined by the following equation. u0 is the value calculated for the VCM current.

$$u=u0 \times Ts/Td$$

Thus, revision of the wave height in response to the sampling interval enables smoother VCM control. When the constant bias current is small, the above equation is used but when the bias current is large, the above equation is applied to the current remaining after the bias current is taken away.

In addition to the above aspect of the embodiment of the present invention, the following types of modification are also possible.

(1) The storage disk device has been explained as a magnetic disk device but this method can also apply to magneto-optical disk devices, optical disk devices, and other storage disk devices.

(2) This method has been explained for a device in which two disks are loaded but can also apply to devices in which one disk is loaded and also to devices in which there are two or more heads.

Some different aspects of the embodiment of the present invention have been explained above but a number of modifications are possible within the main scope of the present invention. These are not excluded from the scope of the present invention.

Industrial Applicability

As explained above, the present invention can provide the following:

(1) Because, in response to a head switching command, the detection time for a servo gate signal is synchronized with the time of the head servo signal for the head in which switching is directed, even if the servo signal search operation is omitted when heads are switched, the servo signal for the head in which switching is directed can be detected.

(2) Therefore, the time involved in switching heads can be reduced and fast head switching operations are enabled.

What is claimed is:

1. A bead positioning control method for a storage disk device which comprises:

multiple storage disks each having two recording faces, each recording face storing servo signals;

a plurality of heads that read information from each of said storage disks, one of the heads being a standard head, each head reading information from a different recording face of one of said storage disks;

an actuator that moves said heads; and a control circuit that positions said heads based on the servo signals read from said recording faces of said storage disks by using a selected one of said plurality of heads, said method comprising:

a step of receiving a head switching cue to switch from a current head to a switched head;

a step of synchronizing a time of a servo gate signal, of said switched head, for detecting said servo signal with a time of said servo signal, read by said switched head; and a step of reading said servo signal from said switched head in response to said synchronized servo gate signal, and positioning said switched head according to said read servo signal, wherein said synchronizing step comprises:

a step of determining a time for reading said servo signal of said switched head, in response to said head switching cue; and a step of synchronizing the time of said servo gate signal with said determined time, and wherein said determining step comprises:

a step of reading a first discrepancy time between said standard head and said current head, and reading a second discrepancy time between said standard head and said switched head; and a step of calculating the time difference between said first and second discrepancy times to determine said time.

2. The head positioning control method for a storage disk device of claim 1, wherein said time determining step comprises a step for determining said time of a value greater than one sample period for said positioning control.

3. The head positioning control method for a storage disk device of claim 1, wherein said synchronizing step comprises a step for time-shifting said servo gate signal for said time difference.

4. The head positioning control method for a storage disk device of claim 3, wherein said time determining step comprises:

a step of determining the detection time of said servo signal for said current head;

a step of determining the detection time of said servo signal for said switched head; and a step of determining the time difference between the two detection times.

5. The head positioning control method for a storage disk device of claim 1, wherein said positioning step comprises:

a step of calculating, in response to said head switching cue, the time difference between the detection time for said current head and the detection time for said switched head;

a step of determining whether or not the said time difference is shorter than one sample interval; and a step of inhibiting positioning in response to said servo gate signal when said time difference is shorter than one sample interval.

6. A head positioning control device for a storage disk apparatus, comprising:

multiple storage disks each having two recording faces, each recording face storing servo signals;

a plurality of heads that read information from each of said storage disks, one of said heads being a standard head, each head reading information from a different recording face of one of said storage disks;

an actuator that moves said heads; and a control circuit that positions said heads based on the servo signal read from said recording face of said storage disk using a selected head, wherein said control circuit comprises:

a synchronization circuit that, in response to a head switching cue to switch from a current head to a switched head, synchronizes the time of a servo gate signal, of said switched head, for detecting said servo signal with the time of the servo signal read by said switched head, and a processing circuit that, in response to said synchronized detection signal, reads the servo signal of said switched head and, in response to the read servo signal, positions the heads, wherein said synchronization circuit comprises:

a memory for storing a discrepancy time between said standard head and each said head; and a circuit for determining a time for reading said servo signal from said switched head, in response to said head switching cue, and synchronizing the time of said servo gate signal with said determined time, and wherein said circuit reads a first discrepancy time between said standard head and said current head and a second discrepancy time between said standard head and said switched head; and calculates the time difference between said first and second discrepancy times to determine said time.

7. The head positioning control device for a storage disk apparatus of claim 6, wherein said synchronization circuit comprises a circuit that determines said time the value of which is greater than one sample period for said positioning control.

8. The head positioning control device for a storage disk apparatus of claim 6, wherein said synchronization circuit comprises:

a circuit that shifts in time said servo gate signal by that time difference.

9. The head positioning control device for a storage disk apparatus of claim 6, wherein said synchronization circuit comprises a circuit for determining from said memory the detection time of said servo signal for said current head and the detection time of the said servo signal for said switched head, and calculating the time difference between the two detection times.

10. The head positioning control device for a storage disk apparatus of claim 6, wherein said processing circuit comprises a circuit that determines whether or not the time difference between the detection time for said current head and the detection time for said switched head is less than one sample interval and that, when said time difference is shorter than one sample interval, inhibits positioning in response to said servo gate signal.

* * * * *